US012664369B2

(12) United States Patent
Dauhiala

(10) Patent No.: US 12,664,369 B2
(45) Date of Patent: Jun. 23, 2026

(54) GENERATION OF IMPOSITION TYPE LISTS FOR INPUT TEXT

(71) Applicant: Vertex, Inc., King of Prussia, PA (US)

(72) Inventor: Lizaveta Dauhiala, Minsk (BY)

(73) Assignee: VERTEX, INC., King of Prussia, PA (US)

( * ) Notice: Subject to any disclaimer, the term of this patent is extended or adjusted under 35 U.S.C. 154(b) by 289 days.

(21) Appl. No.: 18/054,120

(22) Filed: Nov. 9, 2022

(65) Prior Publication Data

US 2024/0152697 A1     May 9, 2024

(51) Int. Cl.
G06F 40/289          (2020.01)
G06F 40/242          (2020.01)
(52) U.S. Cl.
CPC .......... G06F 40/289 (2020.01); G06F 40/242 (2020.01)
(58) Field of Classification Search
USPC .............................................. 704/7–10, 257
See application file for complete search history.

(56) References Cited

U.S. PATENT DOCUMENTS

| | | | |
|---|---|---|---|
| 2023/0022845 A1* | 1/2023 | Meng .................... | G06F 40/279 |
| 2023/0222149 A1* | 7/2023 | Dell ......................... | G06N 7/01 |
| | | | 715/254 |
| 2023/0297784 A1* | 9/2023 | Lopez Garcia ...... | G06Q 10/067 |

* cited by examiner

*Primary Examiner* — Leonard Saint-Cyr
(74) *Attorney, Agent, or Firm* — Alleman Hall LLP

(57)          ABSTRACT

Systems and methods are provided that include a processor executing a program to receive input text, divide the input text into sentences, generate and output sentence embeddings using a sentence embeddings encoder based on the sentences, identify matches in the input text with geographical jurisdictions listed in a table comprising imposition types and their corresponding geographical jurisdictions, generate and output an imposition types list based on the matches identified in the input text, generate and output candidate embeddings, perform a cosine similarity search between the candidate embeddings and the sentence embeddings to generate and output a scored sentence list of sentences comprising cosine similarity scores corresponding to respective top scoring imposition types for each of the sentences in the input text, aggregate the cosine similarity scores in the scored sentence list to determine and output the top scoring imposition types in the input text.

18 Claims, 5 Drawing Sheets

10

COMPUTING DEVICE 11

PROCESSOR 12 | VOLATILE MEMORY 14 | I/O MODULE 16

18

NON-VOLATILE MEMORY 20

MAIN DIVISION RECOGNIZER 22

SENTENCE SEGMENTATION FUNCTION 24

CANDIDATE EMBEDDING ENCODER 30

SENTENCE EMBEDDING ENCODER 32

SEMANTIC SEARCH FUNCTION 38

SCORE AGGREGATOR 42

PROGRAM 46

NETWORK 15 (E.G., LAN, WAN)

QUERY 48

RESULT 50

APPLICATION CLIENT 46A

GUI 54

USER INPUT 56

GRAPHICAL OUTPUT 58

CLIENT COMPUTING DEVICE 52

100

| RECEIVE INPUT TEXT 102 |
| --- |

| IDENTIFY HIGH-LEVEL GEOGRAPHICAL JURISDICTIONS WITHIN THE INPUT TEXT 104 |
| --- |

IDENTIFY MATCHES IN INPUT TEXT WITH JURISDICTIONS LISTED IN SUPPORTED IMPOSITION TYPE TABLE 104a

IDENTIFY MATCHES IN INPUT TEXT WITH JURISDICTIONS LISTED IN UNSUPPORTED IMPOSITION TYPE TABLE 104b

DIVIDE INPUT TEXT INTO SENTENCES BY DETECTING SENTENCE BOUNDARIES 110

GENERATE AND OUTPUT AN IMPOSITION TYPES LIST BASED ON THE MATCHES IDENTIFIED IN THE INPUT TEXT 106

GENERATE AND OUTPUT CANDIDATE EMBEDDINGS USING AN ENCODER, BASED ON THE IMPOSITION TYPES CONTAINED IN THE IMPOSITION TYPES LIST 108

GENERATE AND OUTPUT SENTENCE EMBEDDINGS USING A SENTENCE EMBEDDING ENCODER BASED ON THE SENTENCES 112

PERFORM COSINE SIMILARITY SEARCH BETWEEN THE CANDIDATE EMBEDDINGS AND THE SENTENCE EMBEDDINGS 114

GENERATE AND OUTPUT SCORED SENTENCE LIST COMPRISING COSINE SIMILARITY SCORES CORRESPONDING TO RESPECTIVE TOP SCORING IMPOSITION TYPES FOR EACH OF THE SENTENCES IN THE INPUT TEXT 116

AGGREGATE THE COSINE SIMILARITY SCORES IN THE SCORED SENTENCE LIST TO DETERMINE THE TOP SCORING IMPOSITION TYPES IN THE INPUT TEXT 118

GENERATE AND OUTPUT AN IMPOSITION TYPE PREDICTION LIST CONTAINING THE TOP SCORING IMPOSITION TYPES IN THE INPUT TEXT 120

DISPLAY THE IMPOSITION TYPE PREDICTION LIST ON A GRAPHICAL USER INTERFACE 122

FIG. 4

GENERATION OF IMPOSITION TYPE LISTS FOR INPUT TEXT

BACKGROUND

One of the classic problems in Natural Language Processing (NLP) is the classifying of sentences into one of a plurality of classification types, depending on their semantic content. In conventional methods, semantically meaningful sentence embeddings are derived, so that the sentence embeddings can be compared for similarity with embeddings typical of each classification type. Though these methods are capable of many different sentence classification and semantic search tasks, the quality of the sentence classification and semantic search tasks is insufficient for some applications, such as tax-related applications. As one particular example, inaccurate classifications frequently occur when attempting to classify tax law articles with different tax imposition types, as tax imposition types are often named slightly differently for different jurisdictions.

SUMMARY

In view of the above, a computing system is provided, comprising a processor and memory of a computing device, the processor being configured to execute a program using portions of memory to receive input text, divide the input text into sentences, generate and output sentence embeddings using a sentence embeddings encoder based on the sentences, identify matches in the input text with geographical jurisdictions listed in a table comprising imposition types and their corresponding geographical jurisdictions, generate and output an imposition types list based on the matches identified in the input text, generate and output candidate embeddings using a candidate embeddings encoder based on imposition names corresponding to imposition types contained in the imposition types list, perform a cosine similarity search between the candidate embeddings and the sentence embeddings to generate and output a scored sentence list of sentences comprising cosine similarity scores corresponding to respective top scoring imposition types for each of the sentences in the input text, aggregate the cosine similarity scores in the scored sentence list to determine the top scoring imposition types in the input text, and generate and output an imposition type prediction list containing the top scoring imposition types in the input text.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a flowchart of a method for generating and outputting an imposition type prediction list for an input text according to an example embodiment of the present disclosure.

DETAILED DESCRIPTION

Figure 1:
FIG. 1 illustrates a schematic view of a computing system according to an example of the present disclosure.

Referring to FIG. 1, a system 10 is provided, comprising a computing device 11 comprising a processor 12, an input/output module 16, volatile memory 14, and non-volatile memory 20 storing a program 46 comprising a main division recognizer 22, a sentence segmentation function 24, a candidate embedding encoder 30, a sentence embedding encoder 32, a semantic search function 38, and a score aggregator 42. A bus 18 may operatively couple the processor 12, the input/output module 16, and the volatile memory 14 to the non-volatile memory 20. Although the program 46 is depicted as hosted at one computing device 11, it will be appreciated that the program 46 may alternatively be hosted across a plurality of computing devices to which the computing device 11 is communicatively coupled via a network 15, including a client computing device 52 operatively coupled to the maintenance computing device 11. In some examples, the network 15 may take the form of a local area network (LAN), wide area network (WAN), wired network, wireless network, personal area network, or a combination thereof, and can include the Internet.

The system 10 comprises a processor 12 configured to store the program 46 in non-volatile memory 20 that retains instructions in stored data even in the absence of externally applied power, such as FLASH memory, a hard disk, read only memory (ROM), electrically erasable programmable memory (EEPROM), etc. The instructions include one or more programs, including program 46, and data used by such programs sufficient to perform the operations described herein. In response to execution by the processor 12, the instructions cause the processor 12 to execute the program 46 including the main division recognizer 22, the sentence segmentation function 24, the candidate embedding encoder 30, the sentence embedding encoder 32, the semantic search function 38, and the score aggregator 42.

The processor 12 is a microprocessor that includes one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. The system 10 further includes volatile memory 14 such as random access memory (RAM), static random access memory (SRAM), dynamic random access memory (DRAM), etc., which temporarily stores data only for so long as power is applied during execution of programs.

In one example, a user operating a client computing device 52 may send a query 48 to the computing device 11. As described further with reference to FIG. 3, the query 48 includes text data. The processor 12 of the computing device 11 is configured to receive the query 48 from the user and execute the program 46 to determine an imposition type prediction list predicting what imposition types are mentioned in an input text. The processor 12 then returns a query result 50 to the query 48 based on the determination that was made by the program 46, the result 50 containing an imposition type prediction list that is a result of the determination that was made by the semantic search function 38 and the score aggregator 42.

The client computing device 52 may execute an application client 46A to send a query 48 to the computing device 11 upon detecting a user input 56, and subsequently receive the query results 50 from the computing device 11. The application client 46A may be coupled to a graphical user interface 54 of the client computing device 52 to display a graphical output 58 of the received query results 50.

Figure 2:
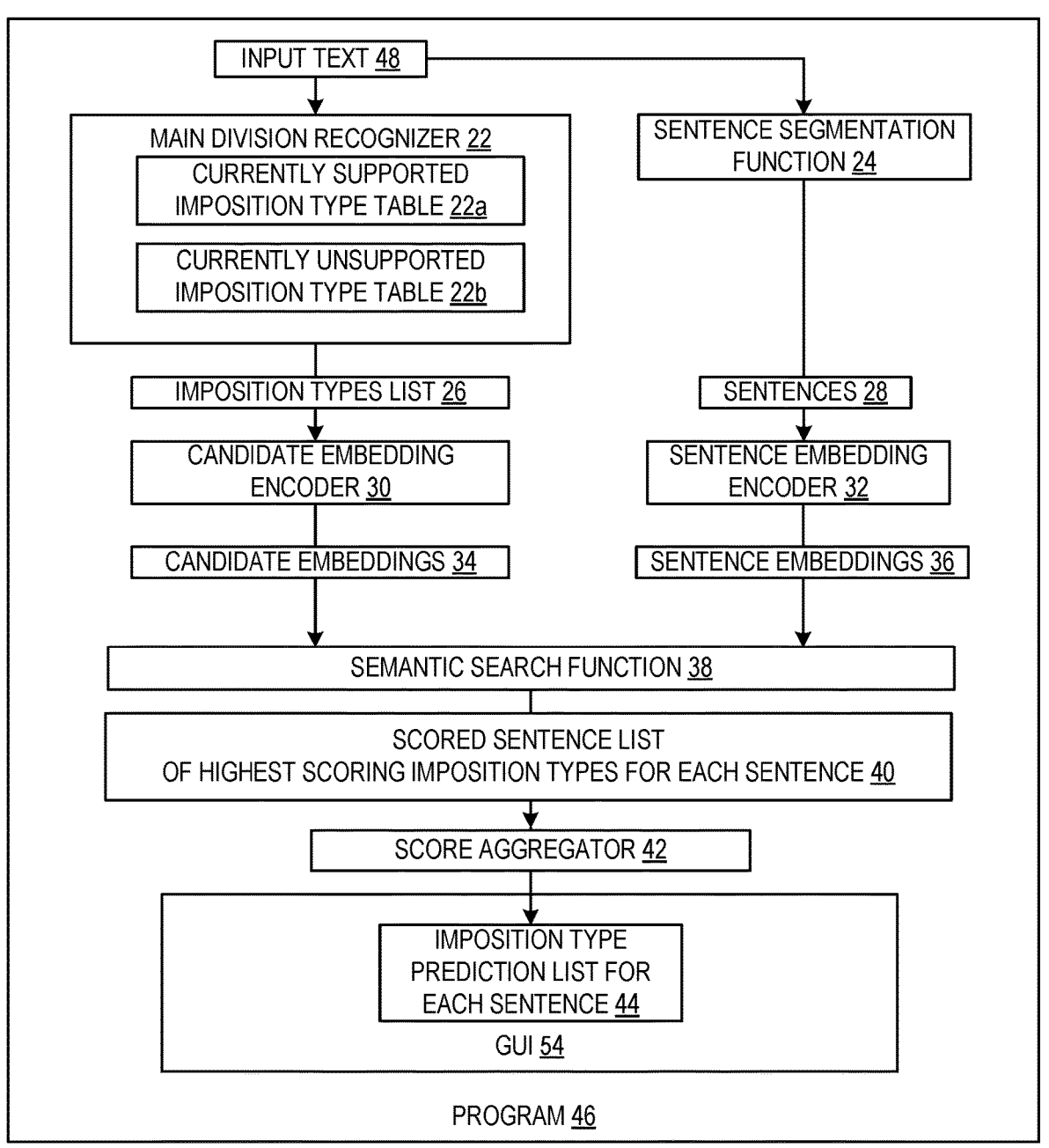
FIG. 2 illustrates a detailed schematic view of the program of the computing system of FIG. 1.

Referring to FIG. 2, a view of the program 46 including the main division recognizer 22, the sentence segmentation function 24, the candidate embedding encoder 30, the sentence embedding encoder 32, the semantic search function 38, and the score aggregator 42 is depicted. The input text 48, which may include tax law articles and other text data from various publications including legal databases, journals, papers, treatises, books, and guides, is processed by a main division recognizer 22, which identifies high-level geographical tax jurisdictions within the input text 48. The main division recognizer 22 includes a currently supported imposition type table 22a, which consists of a plurality of records, each comprising a jurisdiction name, an imposition name, an imposition type ID, and an imposition type. In other words, the currently supported imposition type table 22a comprises currently supported imposition types and their corresponding geographical jurisdictions. The main division recognizer 22 also includes a currently unsupported imposition type table 22b, which consists of a plurality of records, each comprising a jurisdiction name, an imposition name, an imposition type ID, and an imposition type. In other words, the currently unsupported imposition type table 22b comprises currently unsupported imposition types and their corresponding geographical jurisdictions. The imposition name may be set to be identical to the imposition type as a default setting, so that a currently unsupported imposition type will use a generic imposition name as a default name until the imposition name is customized later. By using the currently unsupported imposition type table 22b, the main division recognizer 22 may expand the list of supported impositions for particular jurisdictions as desired by the user.

For example, one record may include 'Bella Vista' as a jurisdiction name, '6' as an imposition type ID, 'Gross Receipts Tax' as an imposition type, and 'Business and Operations Tax' as an imposition name. The jurisdiction name and imposition name are typically strings, while the imposition type ID is typically a number and the imposition type is typically a predefined tax data type. Another record may include 'Florida' as a jurisdiction name, '105' as an imposition type ID, 'Accommodations Tax' as an imposition type, and 'Transient Accommodations Tax' as an imposition name.

The main division recognizer 22 identifies matches in the input text 48 with the high-level geographical tax jurisdictions listed in the currently supported imposition type table 22a as well as in the currently unsupported imposition type table 22b. The main division recognizer 22 generates and outputs an imposition types list 26 based on the matches identified in the input text 48. The imposition types list 26 comprises a list of imposition types corresponding to the tax jurisdictions identified in the input text 48 by the main division recognizer 22. Imposition types may include 'general sales and use tax' and 'motor vehicle excise tax', for example.

The candidate embedding encoder 30 receives input of the imposition types list 26, and generates and outputs candidate embeddings 34 based on the imposition names corresponding to imposition types contained in the imposition types list 26. The candidate embedding encoder 30 may be a Sentence-BERT (Bidirectional Encoder Representations from Transformers) encoder, a modification of a pretrained BERT network which uses Siamese and triplet network structures to derive semantically meaningful sentence embeddings that can be computed using cosine-similarity. The candidate embeddings 34 are one-dimensional tensor vectors which are processed as corpus embeddings in the semantic search function 38.

The sentence segmentation function 24 also receives input of the input text 48, divides the input text 48 into sentences 28 by detecting sentence boundaries, and outputs the sentences 28. The sentence embedding encoder 32 receives input of the sentences 28, and generates and outputs sentence embeddings 36 based on the sentences 28. The sentence embedding encoder 32 may also be a Sentence-BERT encoder similar to the candidate embedding encoder 30. The sentence embeddings 36 are one-dimensional tensor vectors which are processed as query embeddings in the semantic search function 38.

The semantic search function 38 receives input of the candidate embeddings 34 and the sentence embeddings 36, and performs a cosine similarity search between the list of query embeddings (sentence embeddings 36) and the list of corpus embeddings (candidate embeddings 34). Upon completion of the cosine similarity search, the semantic search function 38 generates and outputs a scored sentence list 40 comprising a list with at least one entry for each query (sentence), with each entry being a list of dictionaries with an imposition type key and a score value, sorted by decreasing cosine similarity scores indicated by the score values. In other words, the scored sentence list 40 comprises cosine similarity scores corresponding to respective top scoring imposition types for each of the sentences 28 in the input text 48, the highest scoring imposition type being the predicted imposition type.

A score aggregator 42 receives input of the scored sentence list 40, aggregates the cosine similarity scores in the scored sentence list 40, determines the top scoring imposition types in the input text 48, and generates and outputs an imposition type prediction list 44 containing the top scoring imposition types in the input text 48. The number of top scoring imposition types in the imposition type prediction list 44 is not particularly limited, and may be one imposition type or more. A predetermined cosine similarity score threshold may be used to determine the top scoring imposition types, so that only imposition types which score above the predetermined cosine similarity score threshold are included in the imposition type prediction list 44. The imposition type prediction list 44 may be displayed on a graphical user interface 54.

Figure 3:
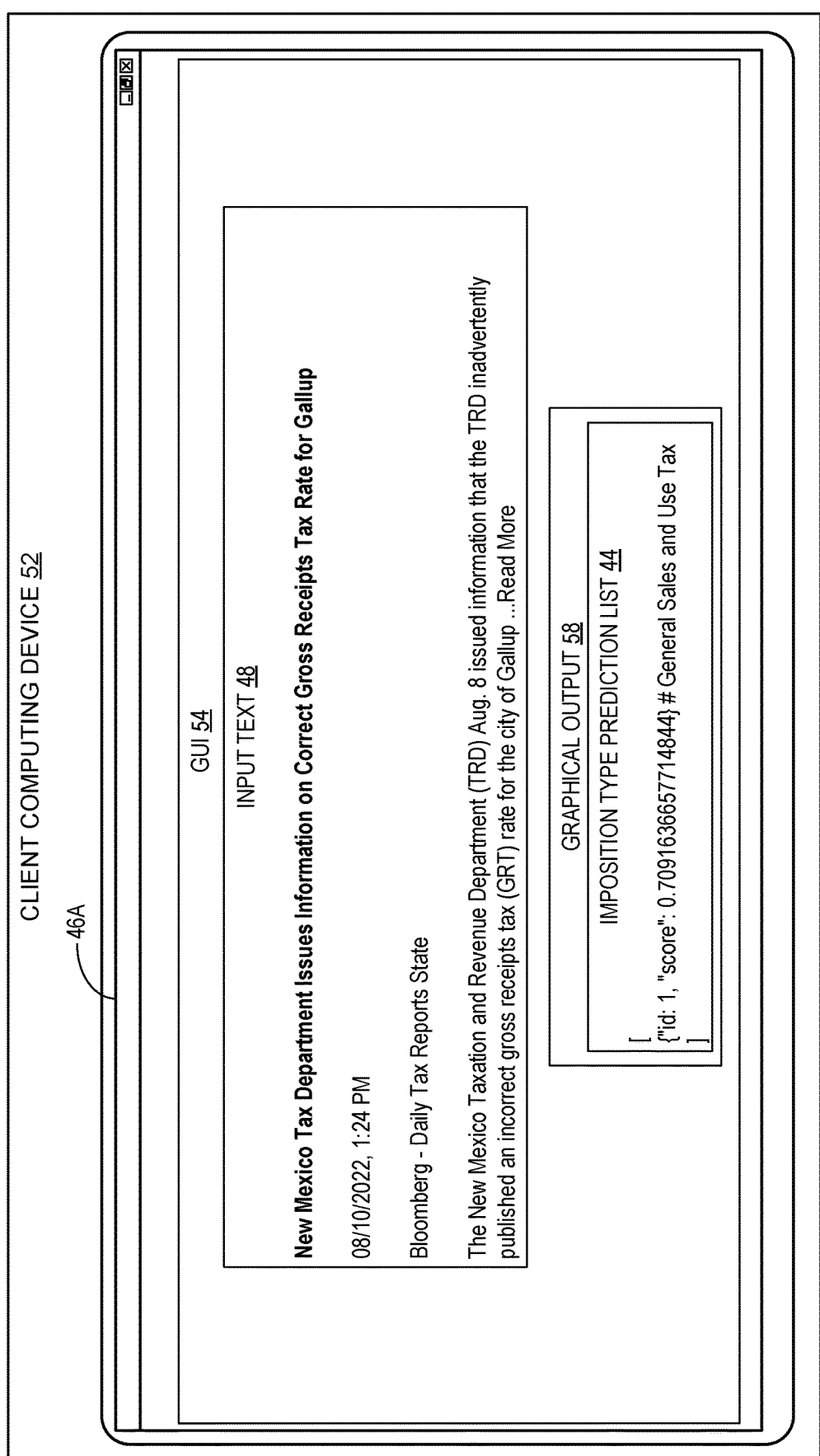
FIG. 3 illustrates one example of an input text and graphical output of the program of FIGS. 1 and 2.

FIG. 3 shows a schematic view of a program 46A, in which an input text 48 is inputted into a graphical user interface 54, and in response an imposition type prediction list 44 corresponding to the input text 48 is outputted on the graphical user interface 54. In this example, the input text 48 relates to a gross receipts tax in New Mexico. The program 46A divides this input text 48 into sentences and processes the sentences to generate and output the imposition type prediction list 44, which may be in a JSON format as shown in FIG. 3. In this example, the input text 48 is classified as corresponding to the general sales and use tax.

Although the above example relates to tax law research, it will be appreciated that the program 46 may be alternatively adapted to be used in other situations where a user may classify a set of input text 48 into different classifications. Notably, the use of multiple layers of processing and filtering by rules-based filter algorithms and neural networks increases the accuracy of the classification of sentences into appropriate classifications.

FIG. 4 illustrates a flowchart of a computerized method 100 for generating and outputting an imposition type prediction list corresponding to an input text. The following description of computerized method 100 is provided with reference to the software and hardware components described above and shown in FIGS. 1 to 3. It will be appreciated that computerized method 100 also may be performed in other contexts using other suitable hardware and software components.

At step 102, input text is received. At step 104, high-level geographical jurisdictions are identified within the input text. Step 104 may include a step 104*a*, at which matches are identified in the input text with high-level geographical jurisdictions listed in the currently supported imposition type table comprising currently supported imposition types and their corresponding geographical jurisdictions. Step 104 may also include a step 104*b*, at which matches are identified in the input text with high-level geographical jurisdictions listed in the currently unsupported imposition type table comprising currently unsupported imposition types and their corresponding geographical jurisdictions. At step 106, an imposition types list is generated and outputted based on the matches identified in the input text. At step 108, candidate embeddings are generated and outputted using an encoder, based on imposition names corresponding to the imposition types contained in the imposition types list. At step 110, the input text is divided into sentences by detecting sentence boundaries. At step 112, sentence embeddings are generated and outputting using a sentence embedding encoder based on the sentences.

At step 114, a cosine similarity search is performed between the candidate embeddings and the sentence embeddings. At step 116, upon completion of the cosine similarity search, a scored sentence list is generated and outputted comprising a list with at least one entry for each sentence, each sentence being a list of dictionaries with an imposition type key and a score value, sorted by decreasing cosine similarity scores indicated by the score values. In other words, the scored sentence list comprises cosine similarity scores corresponding to respective top scoring imposition types for each of the sentences in the input text. At step 118, the cosine similarity scores in the scored sentence list are aggregated to determine the top scoring imposition types in the input text. At step 120, an imposition type prediction list is generated and outputted containing the top scoring imposition types in the input text. At step 122, the imposition type prediction list is displayed on a graphical user interface.

The above-described system and method are provided for tax researchers to accurately identify tax imposition types in tax law articles. This may help tax researchers save time spent on analyzing tax law articles.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
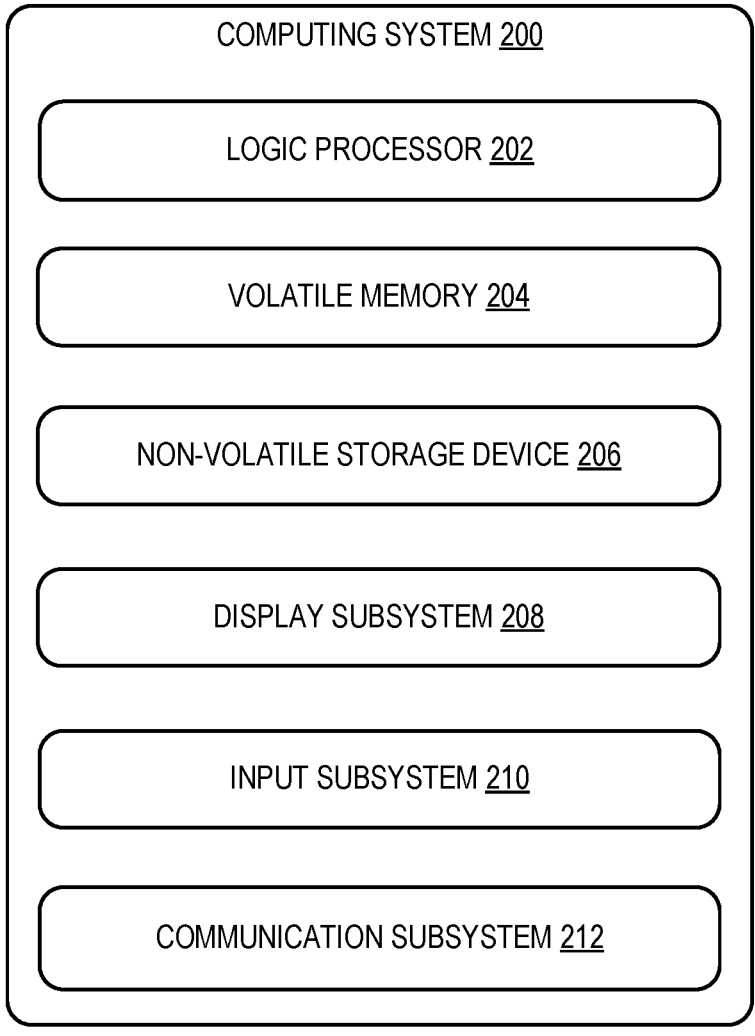
FIG. 5 shows an example computing environment of the present disclosure.

FIG. 5 schematically shows a non-limiting embodiment of a computing system 200 that can enact one or more of the methods and processes described above. Computing system 200 is shown in simplified form. Computing system 200 may embody the computing device 11 and the client computing device 52 described above and illustrated in FIGS. 1-3, respectively. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display sub system 208, input sub system 210, communication sub system 212, and/or other components not shown in FIG. 5.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally, or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a microphone, camera, keyboard, mouse, or touch screen. The microphone may be configured to supply input to a speech recognition module.

When included, communication subsystem 212 may be configured to communicatively couple various computing devices described herein with each other, and with other devices. Communication subsystem 212 may include wired and/or wireless communication devices compatible with one or more different communication protocols. In some embodiments, the communication subsystem may allow computing system 200 to send and/or receive messages to and/or from other devices via a network such as the Internet.

Placeholder for Foreign Claim Support Section

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for generating a tax imposition type prediction list from input text, comprising:
   a processor and memory of a computing device, the processor being configured to execute a program using portions of memory to:
   receive the input text;
   divide the input text into sentences;
   generate and output sentence embeddings using a sentence embeddings encoder based on the sentences;
   identify matches in the input text with geographical jurisdictions listed in a table comprising imposition types and their corresponding geographical jurisdictions;
   generate and output an imposition types list based on the matches identified in the input text;
   train a candidate embeddings encoder on imposition names corresponding to imposition types contained in the imposition types list;
   generate and output candidate embeddings using the candidate embeddings encoder trained on the imposition names corresponding to imposition types contained in the imposition types list;
   perform a vectorized cosine similarity search between the candidate embeddings and the sentence embeddings to generate and output a scored sentence list of sentences comprising cosine similarity scores corresponding to respective top scoring imposition types for each of the sentences in the input text;
   aggregate the cosine similarity scores in the scored sentence list to determine the top scoring imposition types in the input text; and
   generate and output the tax imposition type prediction list containing the top scoring imposition types in the input text, thereby processing the input text to identify the top scoring imposition types as relevant imposition types based on jurisdictional information in the table comprising imposition types and their corresponding geographical jurisdictions, wherein the sentence embeddings and the candidate embeddings are one-dimensional tensor vectors configured to be processed as query embeddings and corpus embeddings in a semantic search function which performs the vectorized cosine similarity search.

2. The computing system of claim 1, wherein the sentence embeddings encoder is a transformer.

3. The computing system of claim 2, wherein the sentence embeddings encoder is a Sentence-BERT (Bidirectional Encoder Representations from Transformers) encoder.

4. The computing system of claim 1, wherein the candidate embeddings encoder is a transformer.

5. The computing system of claim 4, wherein the candidate embeddings encoder is a Sentence-BERT encoder.

6. The computing system of claim 1, wherein a predetermined cosine similarity score threshold is used to determine the top scoring imposition types.

7. The computing system of claim 1, wherein the scored sentence list comprises a list with at least one entry for each sentence, each entry being a list of dictionaries with an imposition type key and a score value, sorted by decreasing cosine similarity scores indicated by the score values.

8. The computing system of claim 1, wherein the table comprises a currently supported imposition type table comprising currently supported imposition types and their corresponding geographical jurisdictions and a currently unsupported imposition type table comprising currently unsupported imposition types and their corresponding geographical jurisdictions.

9. A method for generating a tax imposition type prediction list from input text, the method comprising steps to:

receive the input text;

divide the input text into sentences;

generate and output sentence embeddings using a sentence embeddings encoder based on the sentences;

identify matches in the input text with geographical jurisdictions listed in a table comprising imposition types and their corresponding geographical jurisdictions;

generate and output an imposition types list based on the matches identified in the input text;

train a candidate embeddings encoder on imposition names corresponding to imposition types contained in the imposition types list;

generate and output candidate embeddings using the candidate embeddings encoder trained on the imposition names corresponding to imposition types contained in the imposition types list;

perform a vectorized cosine similarity search between the candidate embeddings and the sentence embeddings to generate and output a scored sentence list of sentences comprising cosine similarity scores corresponding to respective top scoring imposition types for each of the sentences in the input text;

aggregate the cosine similarity scores in the scored sentence list to determine the top scoring imposition types in the input text; and generate and output the tax imposition type prediction list containing the top scoring imposition types in the input text, thereby processing the input text to identify the top scoring imposition types as relevant imposition types based on jurisdictional information in the table comprising imposition types and their corresponding geographical jurisdictions, wherein the sentence embeddings and the candidate embeddings are one-dimensional tensor vectors configured to be processed as query embeddings and corpus embeddings in a semantic search function which performs the vectorized cosine similarity search.

10. The method of claim 9, wherein the sentence embeddings encoder is a transformer.

11. The method of claim 10, wherein the sentence embeddings encoder is a Sentence-BERT (Bidirectional Encoder Representations from Transformers) encoder.

12. The method of claim 9, wherein the candidate embeddings encoder is a transformer.

13. The method of claim 12, wherein the candidate embeddings encoder is a Sentence-BERT encoder.

14. The method of claim 9, wherein a predetermined cosine similarity score threshold is used to determine the top scoring imposition types.

15. The method of claim 9, wherein the scored sentence list comprises a list with at least one entry for each sentence, each entry being a list of dictionaries with an imposition type key and a score value, sorted by decreasing cosine similarity scores indicated by the score values.

16. The method of claim 9, wherein the table comprises a currently supported imposition type table comprising currently supported imposition types and their corresponding geographical jurisdictions and a currently unsupported imposition type table comprising currently unsupported imposition types and their corresponding geographical jurisdictions.

17. A computing system for generating a tax imposition type prediction list from a tax law article, the computing system comprising:

a processor and memory of a computing device, the processor being configured to execute a program using portions of memory to:

receive input text of the tax law article;

generate and output sentence embeddings using a sentence embeddings encoder based on sentences in the tax law article;

generate and output a tax imposition types list based on the tax law article;

train a candidate embeddings encoder on imposition names corresponding to imposition types contained in the tax imposition types list;

generate and output candidate embeddings using the candidate embeddings encoder trained on the imposition names corresponding to tax imposition types contained in the tax imposition types list;

perform a vectorized cosine similarity search between the candidate embeddings and the sentence embeddings to generate and output a scored sentence list comprising cosine similarity scores corresponding to respective top scoring tax imposition types for each of the sentences in the input text;

aggregate the cosine similarity scores in the scored sentence list comprising cosine similarity scores corresponding to respective top scoring tax imposition types for each of the sentences in the input text; and generate and output the tax imposition type prediction list containing the top scoring tax imposition types in the input text, the highest scoring tax imposition type being the predicted tax imposition type, thereby processing the input text to identify the top scoring tax imposition types as relevant imposition types based on jurisdictional information contained in the tax imposition types list, wherein the sentence embeddings and the candidate embeddings are one-dimensional tensor vectors configured to be processed as query embeddings and corpus embeddings in a semantic search function which performs the vectorized cosine similarity search.

18. The computing system of claim 17, wherein the tax imposition types list is generated and outputted based on a table comprising a currently supported tax imposition type table comprising currently supported tax imposition types and their corresponding geographical jurisdictions and a currently unsupported tax imposition type table comprising currently unsupported tax imposition types and their corresponding geographical jurisdictions.

* * * * *